Nov. 3, 1931.  M. L. MARTUS ET AL  1,830,234
BATTERY INITIAL DISCHARGE DEVICE
Filed Feb. 2, 1928
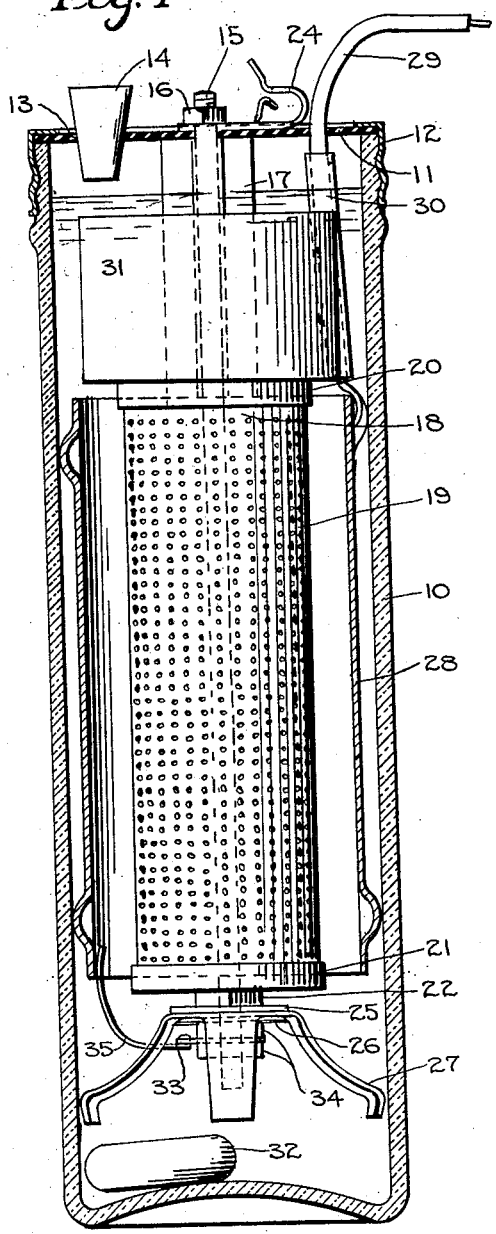
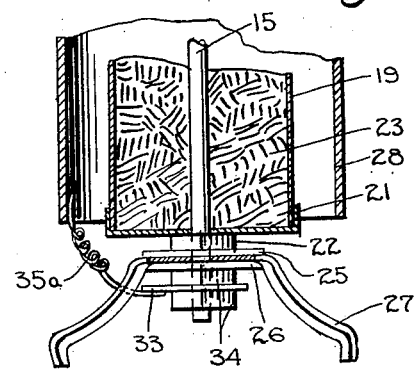
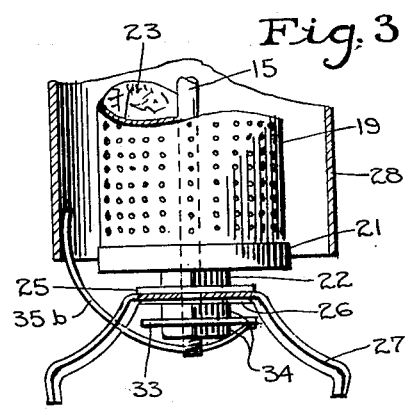
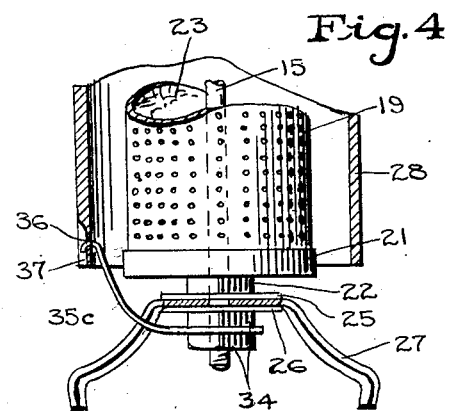
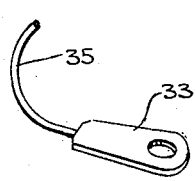
INVENTORS
Martin L. Martus
Edmund H. Becker, and
James G. Ross
ATTORNEYS.
Chamberlain & Newman Patented Nov. 3, 1931

1,830,234

UNITED STATES PATENT OFFICE

MARTIN L. MARTUS, OF WOODBURY, AND EDMUND H. BECKER AND JAMES G. ROSS, OF WATERBURY, CONNECTICUT

BATTERY INITIAL DISCHARGE DEVICE

Application filed February 2, 1928. Serial No. 251,316.

Our invention relates to improvements in primary batteries, and particularly to the class known as the caustic soda-zinc-copper oxide cell. It is well known that these cells are subject to deterioration if let stand on open circuit, the new solution attacking the copper oxide causing it to pass into the solution and fouling the zinc, and eventually short circuiting the cell. These deleterious effects are particularly apparent in a circuit where the discharge rate is very low with long open circuit periods such as occur in a battery operating telephones, open circuit burglar alarms, signal lights, etc. Batteries on this class of work for a period of one year will not exhaust uniformly.

We have discovered that if a cell is discharged continuously for about five to ten per cent of its life immediately upon immersing the elements, thereby changing the character of the elements and electrolyte, these deleterious effects are practically eliminated. During this closed circuit period the initial voltage of the battery is reduced to a point practically equal to the voltage of the battery when near exhaustion, thereby facilitating the adjustment or relays and determining at the time of installation the minimum number of cells necessary to operate the circuit.

We are aware that a battery could be initially discharged through a resistance by making the necessary external connections in the usual way, but this method would not be practical.

Our invention eliminates the human element by including the short circuiting device in the original assembly of the elements, the chemical action of the cell causing it to release at any predetermined time after the elements are immersed.

We have illustrated and described our invention as applied in a satisfactory and particular manner, but it will be obvious that other adaptations may be employed and modifications used without departing from the spirit of the invention, in the accompanying drawings forming a part of this specification and in which similar reference symbols indicate corresponding parts in the several views.

Fig. 1 shows a vertical sectional elevational view or a commercial form of batteries to which our invention is shown applied;

Fig. 2 is a central vertical sectional view through a positive and negative electrode of the type of cell shown in Fig. 1, and illustrating a modified form of the invention;

Fig. 3 is a somewhat similar sectional view, illustrating a further modification;

Fig. 4 illustrates another modified means of carrying the invention into effect; and Fig. 5 shows a detached perspective view of the form of resistance device employed in Fig. 1.

We have used a commercial "add water" type copper oxide-zinc-caustic soda cell to illustrate our invention as in this type the elements are always subjected to a hot solution initially and the cupric oxide is practically non-conductive until the cell has been worked sufficiently to reduce the oxide surface to a metallic copper. The duration of the initial closed circuit is controlled by the nature and thickness of the material used, and can be made to automatically clear itself at practically any predetermined time. The discharge rate is governed by a short link of resistance wire having one end electrically connected to the soluble or holding part and cathode of the cell, the other end serving as a springy extension to engage with the other element of the cell.

This particular cell which we have used to illustrate our invention has a capacity of seventy-five ampere hours. The caustic soda, oil, zinc and copper oxide elements are all self-contained requiring only the addition of water to make the cell active. The copper oxide is in granular form and is contained in a perforated metal container.

Referring in detail to the characters of reference marked upon the drawings, 10 represents a battery jar, 11 an insulative cover and 12 a threaded ring for detachably engaging threads of the upper end portion of the jar for retaining the cover in position. The cover, as shown, is provided with a hole 13 and a stopper 14 for closing the same. The hole serves to receive the central suspension rod 15 held in position by a nut 16. A suitable space 17 is used between the cover and the top end of the negative electrode 18 for rigidly supporting the latter in spaced relation to the top of the jar. The negative electrode shown, includes a perforated basket 19 having top and bottom caps 20 and 21 held against the ends of the cylinder by the before mentioned nut 16 on the top end of the rod and a nut 22 on the lower end. The basket contains a filling of granulated oxide of copper 23 which properly speaking comprises the depolarizing material of the negative electrode. The rod 15 not only serves as a suspension rod by holding negative electrode in position, but also serves as a conductor for the cathode when a field wire is connected to the binding post 24. Adjacent to the nut 22 on the lower end of the rod are insulative discs 25 and 26 between which the hub of a metal spider 27 is positioned upon the rod and insulated therefrom. The spider includes several arms which extend out and downward for engagement with the inner wall of the battery jar so as to center the element within the jar.

The anode 28 is of a cylindrical form provided with means to prevent displacement and hold it in spaced relation to the inner wall of the jar so as to provide a free circulation of the solution on both sides thereof. This element is provided with a rubber-covered resistance wire 29, which extends out through a hole in the cover. This wire is also preferably provided with a hard rubber sleeve 30 within the jar intermediate of the top end of the zinc and the cover so as to better protect the suspension means of the two elements against short circuit.

The cell shown is further provided with caustic soda 31 in cake form which automatically makes the electrolyte when water is added.

The oil capsule 32 shown in the bottom of the jar is made of a soluble material which is acted upon by the water and soda, releasing the oil to seal the solution.

Referring now more specifically to our improved means for effecting an automatic initial discharge of the battery, it will be seen that this device is preferably located in the lower part of the battery and in whole or in part of a metal electro-positive to the cathode or depolarizer of the cell and may be either of the same metal as the anode of the cell, an alloy, a metal such as aluminum, or a substance capable of being dissolved by the electrolyte. The effective operation of the device depends upon the action of the electrolyte solution dissolving the metal or upon the action between the metal and the cathode element of the cell, or both combined. As designed, this device consists preferably of a small sheet metal link 33 cut from stock of approximately .020 of an inch thick, that is electrically connected to the cathode element of the cell, the attachment being preferably made as between the two lower nuts 34 upon the lower threaded end portion of the rod 15. One end of a short piece of hard drawn nichrome resistance wire 35 about 1½ inches long and having a resistance of .2 ohms is secured to the one end portion of the link 33, the free end of the said wire being bent up and disposed into the cylindrical zinc anode so as to frictionally engage the same by spring means and to that extent close the circuit between the two electrodes. This device is obviously made up to form a part of the battery and is put out upon the market assembled in the manner shown, and for the operation of the cell, it is but necessary to fill the same with water, whereupon the voltage gradually increases as the cake of soda dissolves. In about twenty minutes the solution will have reached a temperature of about 140° F., the soda will have completely dissolved into the solution whereupon our novel device will continue to discharge the cell at a rate of approximately 2½ amperes, for a period of about two hours, at which time the soluble link of zinc 33 will have dissolved into the solution thereby releasing the resistance wire 35 which drops by gravity to the bottom of the jar thereby stopping the action at a time which has been predetermined according to the structure of the soluble link.

The modified device shown in Figs. 2, 3 and 4, differ principally in the form of the resistance wire 35$^a$ which is provided with a series of spring coils as shown in Fig. 2. In Fig. 3, the point of securing the wire 35$^b$ to the link is on the opposite side from that shown in Figs. 1 and 2, and affords the use of a longer resistance wire 35$^b$. In Fig. 4, the resistance wire 35$^c$ carried by the link 33 extends up through a hole 36 in the thin lower edge portion 37 of the zinc electrode which in this particular form of device is designed to form the means for breaking the shunt instead of the link as in the other forms.

We have ascertained by means of experimentation that the by-products produced in the cell through the action of the cell have a different effect than when chemicals of exactly the same constituency are introduced into the cell. In other words, the by-products of the action of exhaustion produce an effect which is decidedly favorable to the life of the cell on open circuit. The by-products produced through the action of the cell are zinc complexes, the exact nature of which has as yet not been exactly determined. These complexes are or may be produced by means of zinc and a hydroxyl ion. This is especially so on a cell of this type which is being used over a long period of time either under a very light discharge rate or a discharge which is intermittent and in which the circuit is closed for a short period at relatively long intervals of time. It is on this particular kind of service that our device shows up to its very greatest advantage.

The initial or peak voltage which is a characteristic of the copper oxide—zinc—caustic soda cell is not desirable when lamps are lighted by these batteries as it tends to subject the filament to a slightly higher voltage for a short period of time. This is particularly so when the circuit is first closed. Our device may be used to make the voltage of the cell more uniform. Of course this same result could be obtained by putting in an external shunt of high resistance, but with our device this external shunt is not necessary. If the resistance wire which we have mentioned has a resistance of about 100 ohms, the resulting action in our cell would be a battery with practically no high initial voltage. This device would be especially applicable on cells which are ordinarily on open circuit, but are used for lighting of electric lights for short intervals of time after being on open circuit for a comparatively long time.

The following diagram shows three voltage curves, the first of which is produced by a cell without our device, the second; a cell with our device, and the third; a cell with our device carrying a load of three amperes.

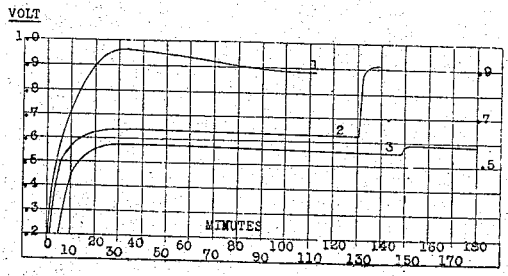

Having thus described our invention, what we desire to secure by Letters Patent is:

1. In a primary battery, positive and negative electrodes, a conductor between the two electrodes within the cell for temporarily closing the circuit, an active solution for dissolving and releasing said conductor by the chemical action of the cell shortly after being immersed.

2. In a primary battery, positive and negative electrodes, a metal connector secured to one electrode within the cell and engaging the other for temporarily closing the circuit of the cell, an active solution for automatically releasing the connector by the chemical action of the cell shortly after being immersed.

3. In a primary battery, an anode, a cathode, an active solution therefor, a metal electro-positive to the negative element capable of being dissolved by an electrolyte, connecting the two said electrodes within the cell whereupon the internal discharge of the cell does not materially decrease the commercial efficiency of the cell.

4. In a primary battery, positive and negative electrodes, an active solution therefor, a metal connector secured to one electrode and engaging the other within the cell and electro-positive to the negative element, capable of being dissolved by an electrolyte whereupon the internal discharge of the cell does not materially decrease the efficiency of the cell.

5. In a primary battery, positive and negative electrodes, an active solution therefor, a metal connector including a resistance wire extending from one electrode to the other within the cell and adapted to function to form a temporarily closed circuit for a limited time and capable of being dissolved by electro-chemical action of the cell.

6. In a primary battery, a positive and negative electrode, an active solution, a metal connector, one end attached to one of said electrodes and its other end disposed against the opposite electrode to form a temporary closed circuit within the cell, and capable of being quickly dissolved to break the connection by functioning of the electrolyte.

7. In a primary battery, positive and negative electrodes, an active solution therefor, the negative electrode including a suspension rod, an electric connector attached to said rod including a resistance wire having its free end portion disposed against the other electrode within the cell and capable of being dissolved by limited functioning of the electrolyte to break the connection.

8. In a primary battery, a positive element, a negative element and depolarizer, an electrolyte solution, a metal conductor in contact with both of said elements within the cell, said conductor automatically opening one of said contacts through the action of the cell shortly after cell starts functioning.

9. In a primary cell, positive and negative elements, an electrolyte solution therefor, a conductor of electric current within the cell for temporarily closing the circuit, the chemical action of the cell serving to dissolve the conductor after a limited time, to open the circuit.

10. In a primary cell, positive and negative elements therefor, an electrolyte salt to make the electrolyte solution when mixed with water, an electrical conductor temporarily closing the circuit within the cell through a low resistance, said circuit being independent of the working circuit of the battery, means for opening said temporary low resistance circuit within a predetermined time after the cell has been made active.

11. In a primary cell, assembly including positive and negative elements, an electrolyte salt therefor, an electrical conductor closing the circuit between the electrodes, means within the cell to automatically open said circuit at a predetermined time after making the cell active.

12. In a primary cell assembly including positive and negative elements, an electrolyte salt therefor, an electrical conductor of sufficient resistance to prevent overloading the cell, closing the circuit between the electrodes, means within the cell to automatically open said circuit at a predetermined time after making the cell active.

13. A primary cell of the Lalande type having a metal conductor of predetermined resistance between the positive and negative elements, one end of said conductor in contact with the depolarizer element within the cell, the other end in contact with an adjacently positioned metal electro-positive to copper, and means whereby the contact between said conductor and one of the elements will be automatically discontinued at a controllable time after the cell starts functioning.

14. A primary cell of the Lalande type having a metal conductor of predetermined resistance, one end of said conductor in contact within the cell with the positive electrode of the cell, the other end in contact with an adjacently positioned metal electro-negative to the positive electrode, and means whereby the contact between said conductor and one of the elements will be discontinued within a controllable time interval after the cell starts functioning.

15. The method of producing a change in the characteristics of a cell of the Lalande type beneficial to the operation of the cell by producing an internal closed circuit between the anode and cathode within the cell.

16. In a Lalande type of battery the method of producing a zinc complex beneficial to the operation of a cell by producing an automatic temporary internal closed circuit between the electrodes within the cell.

17. The method of producing a change in the operating characteristics of a cell having a caustic soda electrolyte and a zinc electrode beneficial to the operation of the cell by producing a temporary internal closed circuit between the anode and cathode within the cell.

18. The method of producing a change in the operating characteristics of a cell having an alkali electrolyte and a zinc electrode beneficial to the operation of the cell by causing a temporary internal discharge circuit within the cell.

19. The method of forming zinc complexes in a battery electrolyte automatically by electro-chemical means within the cell by producing a temporary internal closed circuit between the elements within the electrolyte.

Signed at Waterbury in the county of New Haven and State of Connecticut this 27th day of January, A. D. 1928.

MARTIN L. MARTUS.
EDMUND H. BECKER.
JAMES G. ROSS.